United States Patent [19]

Emert et al.

[11] Patent Number: 5,294,234
[45] Date of Patent: Mar. 15, 1994

[54] FUEL COMPOSITIONS OF NOVEL ETHYLENE ALPHA-OLEFIN POLYMERS SUBSTITUTED AMINE DISPERSANT ADDITIVES

[75] Inventors: Jacob Emert, Brooklyn, N.Y.; Alan M. Schilowtiz, Highland Park; Antonio Gutierrez, Mercerville, N.J.; Won R. Song, Short Hills, N.J.

[73] Assignee: Exxon Chemical Patents Inc., Linden, N.J.

[21] Appl. No.: 23,222

[22] Filed: Feb. 25, 1993

Related U.S. Application Data

[62] Division of Ser. No. 473,580, Feb. 1, 1990, Pat. No. 5,225,092.

[51] Int. Cl.⁵ ............................................. C10L 1/22
[52] U.S. Cl. .................................................. 44/412
[58] Field of Search ....................................... 44/412

[56] References Cited

U.S. PATENT DOCUMENTS

| | | | |
|---|---|---|---|
| 3,950,426 | 4/1976 | Culbertson | 260/583 P |
| 4,152,499 | 5/1979 | Boerzel et al. | 526/52.4 |
| 4,234,435 | 11/1980 | Meinhardt et al. | 252/51.5 A |
| 4,238,202 | 12/1980 | Trepka et al. | 44/412 |
| 4,668,834 | 5/1987 | Rim et al. | 585/12 |
| 4,704,491 | 11/1987 | Tsutsui et al. | 585/10 |
| 4,715,975 | 12/1987 | Kapusciniski et al. | 252/50 |
| 4,959,077 | 9/1990 | Martischius et al. | 44/412 |
| 5,017,299 | 5/1991 | Gutierrez et al. | 252/51.5 R |

FOREIGN PATENT DOCUMENTS

| | | | |
|---|---|---|---|
| 0129368 | 5/1984 | European Pat. Off. | C08F 10/00 |
| 0128046 | 12/1984 | European Pat. Off. | C08F 10/00 |
| 0132383 | 1/1985 | European Pat. Off. | C10M 133/5 |
| 0257696 | 12/1987 | European Pat. Off. | C07C 2/34 |
| 0305022 | 3/1989 | European Pat. Off. | C10M 163/0 |
| 0353935 | 2/1990 | European Pat. Off. | C10M 129/9 |
| 1465913 | 1/1965 | France. | |
| 2154120 | 9/1972 | France | C10M 1/00 |
| 2186527 | 5/1973 | France | C10M 1/32 |
| 0129303 | 12/1987 | Japan. | |
| 88/01626 | 3/1988 | World Int. Prop. O. | C08F 10/00 |

*Primary Examiner*—Jacqueline V. Howard
*Attorney, Agent, or Firm*—J. F. Hunt

[57] ABSTRACT

The present invention is directed to an oil-soluble lubricating oil additive comprising at least one terminally unsaturated ethylene alpha-olefin polymer of 300 to 20,000 number average molecular weight terminally substituted with amine compounds, which are also useful additives to oleaginous compositions, e.g., as fuel and lubricating oil dispersants.

20 Claims, No Drawings

FUEL COMPOSITIONS OF NOVEL ETHYLENE ALPHA-OLEFIN POLYMERS SUBSTITUTED AMINE DISPERSANT ADDITIVES

This is a division of application Ser. No. 473,580, filed Feb. 1, 1990 now U.S. Pat. No. 4,225,092.

FIELD OF THE INVENTION

This invention relates to improved oil soluble dispersant additives useful in oleaginous compositions, including fuels and lubricating oil compositions, and to concentrates containing said additives.

BACKGROUND OF THE INVENTION

Ashless nitrogen and ester containing lubricating oil dispersants have been widely used by the industry. Typically, these dispersants are prepared from a long chain hydrocarbon polymer by reacting the polymer with maleic anhydride to form the corresponding polymer which is substituted with succinic anhydride groups. Polyisobutylene has been widely used as the polymer of choice, chiefly because it is readily available by cationic polymerization from butene streams (e.g., using $AlCl_3$ catalysts). Such polyisobutylenes generally contain residual unsaturation in amounts of about one ethylenic double bond per polymer chain, positioned along the chain.

The polyisobutylene polymers (PIB) employed in most conventional dispersants are based on a hydrocarbon chain of a number average molecular weight ($\overline{M}_n$) of from about 900 to about 2500. PIB having a $\overline{M}_n$ of less than about 300 gives rather poor performance results when employed in dispersants because the molecular weight is insufficient to keep the dispersant molecule fully solubilized in lubricating oils. On the other hand, high molecular weight PIB ($\overline{M}_n > 3000$) becomes so viscous that conventional industrial practices are incapable of handling this product in many operations. This problem becomes much more severe as the PIB molecular weight increases to 5000 or 10,000.

Increased amounts of terminal ethylenic unsaturation in polyisobutylene (so-called "reactive polyisobutylene") has been achieved by $BF_3$ catalyzed polymerization of isobutylene. Exemplary of references disclosing these polymers is U.S. Pat. No. 4,152,499. However, such reactive polyisobutylene materials can still contain substantial amounts of unsaturation elsewhere along the chain. Further, it is difficult to produce such reactive polyisobutylene polymers at molecular weights of greater than about 2,000, and, even so, the reactive polyisobutylenes themselves still suffer the above-noted viscosity increase disadvantages as molecular weights are increased.

Other polymers, such as ethylene-propylene copolymers and terpolymers containing non-conjugated dienes, have been disclosed as suitable polymers for the preparation of ashless nitrogen and ester dispersants.

U.S. Pat. No. 4,234,435, for example, discloses dispersants prepared from polyalkenes, $\overline{M}_n$ of 1,300 to about 5,000. The polyalkene can comprise homopolymers or interpolymers of $C_2$ to $C_{16}$ terminal olefins, of which ethylene-propylene copolymers are said to be examples, with specific reference to a copolymer of 804 ethylene and 20% propylene.

However, ethylene-alpha-olefin copolymers of the above molecular weights could be produced using Ziegler-Natta catalysts only in combination with $H_2$ as molecular weight control in order to terminate the growing copolymer chains within this molecular weight range. Without use of $H_2$ or other conventional, so-called "chain stoppers", the copolymers produced with Ziegler-Natta catalysts would tend to have molecular weights greatly in excess of the above range. (Such higher copolymers, for example, are widely employed in ungrafted form as viscosity index improvers, and when grafted with nitrogen-containing groups, as described below, are conventionally employed as dispersant-viscosity index improver polymers.) The use of $H_2$ as a chain stopper has the disadvantage of causing the saturation of the olefinic double bond content of the copolymer. Thus, while lower molecular weight copolymers were theoretically possible to prepare, their low unsaturation content (and the accompanying low graft copolymer yields) would have made their further functionalization by a thermal "enell reaction, e.g., with dicarboxylic acid moieties in preparing dispersants, highly unattractive.

U.S. Pat. No. 4,668,834 to Uniroyal Chemical discloses preparation (via certain metallocene and alumoxane catalyst systems) and composition of ethylene-alpha olefin copolymers and terpolymers having vinylidene-type terminal unsaturation, which are disclosed to be useful as intermediates in epoxy-grafted encapsulation compositions.

U.S. Pat. No. 4,704,491 to Mitsui Petrochemical relates to liquid ethylene alpha-olefin random copolymers, useful when hydrogenated as synthetic lubricant oil, characterized inter alia by having 10–85 mol.% ethylene units, 15–90 mol.% alpha-olefin units, $\overline{M}_n$ of from 300 to 10,000 and a $\overline{w}/\overline{M}_n$ of not more than 2.5. The patent also indicates that the liquid copolymer can be easily modified since it has a double bond capable of reacting with maleic anhydride, etc., at the molecular chain ends.

Japanese Published Patent Application 87-129,303A of Mitsui Petrochemical relates to narrow molecular weight distribution ($\overline{M}_w/\overline{M}_n < 2.5$) ethylene alpha-olefin copolymers containing 85-99 mol% ethylene, which are disclosed to be used for dispersing agents, modifiers or materials to produce toners. The copolymers (having crystallinity of from 5–85%) are prepared in the presence of a catalyst system comprising Zr compounds having at least one cycloalkadienyl group and alumoxane.

European Patent 128,046 discloses (co)polyolefin reactor blends of polyethylene and ethylene higher alpha-olefin copolymers prepared by employing described dual-metallocene/alumoxane catalyst systems.

European Patent Publication 129,368 discloses metallocene/alumoxane catalysts useful for the preparation of ethylene homopolymer and ethylene higher alpha-olefin copolymers.

European Patent Application Publication 257,696 Al relates to a process for dimerizing alpha-olefins using a catalyst comprising certain metallocene/alumoxane systems.

European Patent Publication 305,022-Al to Mitsui Petrochemical relates to certain synthetic hydrocarbon lubricating oil compositions containing a load-withstanding additive and a liquid ethylene alpha-olefin random copolymer modified by graft copolymerization with an unsaturated carboxylic acid or derivative thereof (e.g., maleic anhydride) . The ethylene alpha-olefin copolymers ($\overline{M}_n$ of 300 to 12,000) are obtained using Ziegler catalysts (e.g., catalyst formed from soluble V compound and an organo aluminum compound), are grafted in the presence of a free radical initiator.

PCT Published Patent Application WO 88/01626 relates to transition metal compound/alumoxane catalysts for polymerizing alpha-olefins.

SUMMARY OF THE INVENTION

The present invention is directed to an oil-soluble fuel and lubricating oil additive comprising ethylene alpha-olefin interpolymers of 300 to 20,000 number average molecular weight terminally substituted with amines, wherein the ethylene alpha-olefin polymer group is derived from a terminally unsaturated ethylene alpha-olefin polymer wherein the terminal unsaturation comprises ethenylidene unsaturation. The amine-substituted polymers of this invention are useful per se as additives to fuels and lubricating oils.

The materials of the invention are different from the prior art because of their effectiveness and their ability to provide enhanced lubricating oil dispersancy, as exhibited by their enhanced sludge and varnish control properties. In fuels, the additives serve to minimize the degree of carburetor and intake valve fouling from deposits. In addition, the additives of this invention possess superior viscometric properties.

The process of this invention permits the preparation of lubricating oil and fuel dispersant additives which are simultaneously characterized by a high active ingredient content (usually at least about 60 wt.%, up to about 95 wt.%) and by advantageous viscosity properties to permit the additives to be readily handled. In addition, the amine-substituted ethylene alpha-olefin polymers of this invention can be characterized by VR values (as hereinafter defined) of not greater than about 4.1, thereby providing advantageous viscosity modifying properties to the lubricating oils containing them. The present invention can produce such substituted polymers in a more highly concentrated form than prior art materials, thereby reducing the possible processing difficulties which are associated with less concentrated fuel and halogen-containing lubricating oil additives.

Further, dispersant materials can be prepared from the substituted polymers of this invention to provide fuel and lubricating oil dispersant products having VR' values of not greater than about 4.1 and VR'/VR$_r$ ratios of less than about 1.11 (as such values and ratios are hereinafter defined). Surprisingly, the process of this invention permits the preparation of highly concentrated dispersants from high molecular weight ethylene-alpha-olefin polymers ($\overline{M}_n > 5000$, e.g., 5,500–20,000) of superior viscosity properties.

In distillate fuels, the dispersant materials of this invention can reduce the formation of intake valve deposits in an internal combustion engine while minimizing valve sticking and crankcase oil thickening.

DETAILED DESCRIPTION OF THE INVENTION

Preparation of Ethylene Alpha-olefin Polymer

The polymers employed in this invention are polymers of ethylene and at least one alpha-olefin having the formula $H_2C=CHR^1$ wherein $R^1$ is straight chain or branched chain alkyl radical comprising 1 to 18 carbon atoms and wherein the polymer contains a high degree of terminal ethenylidene unsaturation. Preferably $R^1$ in the above formula is alkyl of from 1 to 8 carbon atoms, and more preferably is alkyl of from 1 to 2 carbon atoms. Therefore, useful comonomers with ethylene in this invention include propylene, 1-butene, hexane-1, octene-1, 4-methylpentene-1, decene-1, dodecene-1, tridecene-1, tetradecene-1, pentadecene-1, hexadecene-1, heptadecene-1, octadecene-1, nonadecene-1 and mixtures thereof (e.g., mixtures of propylene and 1-butene, and the like).

Exemplary of such polymers are ethylene-propylene copolymers, ethylene-butene-1 copolymers and the like. Preferred polymers are copolymers of ethylene and propylene and ethylene and butene-1.

The molar ethylene content of the polymers employed in this invention is preferably in the range of between about 20 and about 80 percent, and more preferably between about 30 and about 70 percent. When propylene and/or butene-1 are employed as comonomer(s) with ethylene, the ethylene content of such copolymers is most preferably between about 45 and about 65 percent, although higher or lower ethylene contents may be present.

The polymers employed in this invention generally possess a number average molecular weight of from about 300 to about 20,000 (e.g., from 300 to 10,000), preferably from about 900 to 20,000; more preferably of from about 900 to 10,000 (e.g., from about 700 to about 15,000); from about 1500 to about 5,000. Polymers having a number average molecular weight within the range of from about 700 to 5,000 (e.g., 1500 to 3,000) are particularly useful in the present invention. The number average molecular weight for such polymers can be determined by several known techniques. A convenient method for such determination is by size exclusion chromatography (also known as gel permeation chromatography (GPC)) which additionally provides molecular weight distribution information, see W. W. Yau, J. J. Kirkland and D. D. Bly, "Modern Size Exclusion Liquid Chromatography", John Wiley and Sons, New York, 1979.

Consequently, such polymers generally possess an intrinsic viscosity (as measured in tetralin at 135° C.) of between about 0.025 and about 0.9 dl/g, preferably of between about 0.05 and about 0.5 dl/g, most preferably of between about 0.075 and about 0.4 dl/g.

The polymers employed in this invention preferably exhibit a degree of crystallinity such that, when grafted, they are essentially amorphous.

The polymers employed in this invention are further characterized in that up to about 95% and more of the polymer chains possess terminal ethenylidene-type unsaturation. Thus, one end of such polymers will be of the formula POLY—C($T^1$)=CH$_2$ wherein $T^1$ is $C_1$ to $C_{18}$ alkyl, preferably $C_1$ to $C_8$ alkyl, and more preferably $C_1$ to $C_2$ alkyl, (e.g., methyl or ethyl) and wherein POLY represents the polymer chain. The chain length of the $T^1$ alkyl group will vary depending on the comonomer(s) selected for use in the polymerization. A minor amount of the polymer chains can contain terminal ethenyl unsaturation, i.e. POLY—CH=CH$_2$, and a portion of the polymers can contain internal monounsaturation, e.g. POLY—CH=CH($T^1$), wherein $T^1$ is as defined above.

The polymer employed in this invention comprises polymer chains, at least about 30 percent of which possess terminal ethenylidene unsaturation. Preferably at least about 50 percent, more preferably at least about 60 percent, and most preferably at least about 75 percent (e.g. 75–98%), of such polymer chains exhibit terminal ethyenylidene unsaturation. The percentage of polymer chains exhibiting terminal ethyenylidene unsaturation may be determined by FTIR spectroscopic analysis, titration, or $C^{13}$NMR. NMR.

The polymer and the composition employed in this invention may be prepared as described in U.S. Pat. No. 4,668,834, in European Patent Publications 128,046 and 129,368, and in co-pending Serial No. 728,111, filed Apr. 29, 1985, and copending Serial No. 93,460, filed Sep. 10, 1987, the disclosures of all of which are hereby incorporated by reference in their entirety.

The polymers for use in the present invention can be prepared by polymerizing monomer mixtures comprising ethylene in combination with other monomers such as alpha-olefins having from 3 to 20 carbon atoms (and preferably from 3-4 carbon atoms, i.e., propylene, butene-1, and mixtures thereof) in the presence of a catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers.

The catalysts employed in the production of the reactant polymers are organometallic coordination compounds which are cyclopentadienyl derivatives of a Group 4b metal of the Periodic Table of the Elements (56th Edition of Handbook of Chemistry and Physics, CRC Press [1975]) and include mono, di and tricyclopentadienyls and their derivatives of the transition metals. Particularly desirable are the metallocene of a Group 4b metal such as titanium, zirconium, and hafnium. The alumoxanes employed in forming the reaction product with the metallocenes are themselves the reaction products of an aluminum trialkyl with water.

In general, at least one metallocene compound is employed in the formation of the catalyst. As indicated, supra, metallocene is a metal derivative of a cyclopentadiene. The metallocenes usefully employed in accordance with this invention contain at least one cyclopentadiene ring. The metal is selected from the Group 4b preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent (e.g., up to 5 $C_1$ to $C_5$ hydrocarbyl substituents) or other substituents, e.g. such as, for example, a trialkyl silyl substituent. The metallocene can contain one, two, or three cyclopentadienyl rings; however, two rings are preferred.

Useful metallocenes can be represented by the general formulas:

$(Cp)_m MR_n X_q$ 

wherein Cp is a cyclopentadienyl ring, M is a Group 4b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3.

$(C_5R'_k)_g R''_s(C_5R'_k)MQ_{3-g}$ and     II.

$R''_s(C_5R'_k)_2 MQ'$ 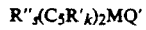    III.

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms, a silicon containing hydrocarbyl radical, or hydrocarbyl radicals wherein two carbon atoms are joined together to form a $C_4$-$C_6$ ring, R'' is a $C_1$-$C_4$ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1-20 carbon atoms, hydrocarboxy radical having from 1-20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1, and k is 5 when s is 0, and M is as defined above. Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary silicon containing hydrocarbyl radicals are trimethylsilyl, triethylsilyl and triphenylsilyl. Exemplary halogen atoms include chlorine, bromine, fluorine and iodine and of these halogen atoms, chlorine is preferred. Exemplary hydrocarboxy radicals are methoxy ethoxy, butoxy, amyloxy and the like. Exemplary of the alkylidene radicals is methylidene, ethylidene and propylidene.

Illustrative, but non-limiting examples of the metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl) titanium ethyl chloride bis(cyclopentadienyl)titanium phenyl chloride, bis(cyclopentadienyl)zirconium hydrochloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide, bis(cyclopentadienyl)titanium methyl iodide, bis(cyclopentadienyl)titanium ethyl bromide, bis(cyclopentadienyl) titanium ethyl iodide, bis(cyclopentadienyl)titanium phenyl bromide, bis(cyclopentadienyl)titanium phenyl iodide, bis(cyclopentadienyl)zirconium methyl bromide, bis(cyclopentadienyl)zirconium methyl iodide, bis(cyclopentadienyl)zirconium ethyl bromide. bis(cyclopentadienyl)zirconium ethyl iodide, bis(cyclopentadienyl)zirconium phenyl bromide, bis(cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed are monocyclopentadienyls titanocenes such as, pentamethylcyclopentadienyl titanium trichloride, pentaethylcyclopentadienyl titanium trichloride, bis(pentamethylcyclopentadienyl) titanium diphenyl, the carbene represented by the formula bis(cyclopentadienyl) titanium=$CH_2$ and derivatives of this reagent such as bis(cyclopentadienyl)Ti=CH$_2$.Al(CH$_3$)$_3$, (Cp$_2$TiCH$_2$)$_2$, Cp$_2$TiCH$_2$CH(CH$_3$)CH$_2$, Cp$_2$Ti—CH$_2$CH$_2$CH$_2$; substituted bis(Cp)Ti(IV) compounds such as bis(indenyl) titanium diphenyl or dichloride, bis(methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)-titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethylsilyldicyclopentadienyl titanium diphenyl or dichloride, methyl phosphine dicyclopentadienyl titanium diphenyl or dichloride, methylenedicyclopentadienyl titanium diphenyl or dichloride and other complexes described by formulae II and III.

Illustrative but non-limiting examples of the zirconocenes of Formula II and III which can be usefully employed are, pentamethylcyclopentadienyl zirconium trichloride, pentaethylcyclopentadienyl zirconium trichloride, the alkyl substituted cyclopentadienes, such as bis(ethylcyclopentadienyl)zirconium dimethyl, bis(-beta-phenylpropylcyclopentadienyl) zirconium dimethyl, bis(methylcyclopentadienyl)zirconium dimethyl, bis (n-butylcyclopentadienyl) zirconium dimethyl bis(cyclohexylmethylcyclopentadienyl)zirconium dimethyl bis(n-octyl-cyclopentadienyl)zirconium dimethyl, and haloalkyl and dihydride, and dihalide complexes of the above; dialkyl, trialkyl, tetra-alkyl, and penta-alkyl cyclopentadienes, such as bis(-pentamethylcyclopentadienyl)zirconium diphenyl, bis(-pentamethylcyclopentadienyl)zirconium dimethyl, bis(1,2-dimethylcyclopentadienyl)zirconium dimethyl and mono and dihalide and hydride complexes of the above; silicon, phosphorus, and carbon bridged cyclopentadiene complexes such as dimethylsilyldicyclopentadienyl zirconium dimethyl, methyl halide or dihalide, and methylene dicyclopentadienyl zirconium dimethyl, methyl halide, or dihalide. Mono, di and tri-silyl substituted cyclopentadienyl compounds such as bis(trimethylsilylcyclopentadienyl)zirconium dichloride and dimethyl bis(1,3-di-trimethylsilylcyclopentadienyl)zirconium dichloride and dimethyl and bis(1,2,4-tri-trimethylsilylcyclopentadienyl)zirconium dichloride and dimethyl. Carbenes represented by the formulae Cp$_2$Zr=CH$_2$P(C$_6$H$_5$)$_2$CH$_3$, and derivatives of these compounds such as Cp$_2$ZrCH$_2$CH(CH$_3$)CH$_2$.

Mixed cyclopentadienyl metallocene compounds such as cyclopentadienyl (pentamethyl cyclopentadienyl)zirconium dichloride, (1,3-di-trimethylsilylcyclopentadienyl) (pentamethylcyclopentadienyl) zirconium dichloride, and cyclopentadienyl(indenyl) zirconium dichloride can be employed.

Most preferably, the polymers used in this invention are substantially free of ethylene homopolymer.

Bis(cyclopentadienyl)hafnium dichloride, bis(cyclopentadienyl)hafnium; dimethyl, bis(cyclopentadienyl)vanadium dichloride and the like are illustrative of other metallocenes.

Some preferred metallocenes are bis(cyclopentadienyl)zirconium; dimethyl, bis(cyclopentadienyl)zirconium dichloride; bis(cyclopentadienyl)titanium dichloride; bis(methylcyclopentadienyl) zirconium dichloride; bis(methylcyclopentadienyl)titanium dichloride; bis (n-butylcyclopentadienyl) zirconium dichloride; dimethylsilyldicyclopentadienyl zirconium dichloride; bis(trimethylsilycyclopentadienyl)zirconium dichloride; and dimethylsilyldicyclopentadienyl titanium dichloride; bis(indenyl)zirconium dichloride; bis(4,5,6,7-tetrahydroindenyl)zirconium dichloride; the racemic and/or meso isomer of 1,2-ethylene-bridged bis(4,5,6,7-tetrahydroindenyl)zirconium dichloride; the racemic and/or meso isomer of 1,1-dimethylsilyl-bridged bis(4,5,6,7-tetrahydroindenyl)zirconium dichloride; and the racemic and/or meso isomer of 1,1-dimethylsilyl-bridged bis(methylcyclopentadienyl)zirconium dichloride.

The alumoxane compounds useful in the polymerization process may be cyclic or linear. Cyclic alumoxanes may be represented by the general formula (R—Al—O)$_n$ while linear alumoxanes may be represented by the general formula R(R—Al—O)n'AlR$_2$. In the general formula R is a C$_1$-C$_5$ alkyl group such as, for example, methyl, ethyl, propyl, butyl and pentyl, n is an integer of from 3 to 20, and n' is an integer from 1 to about 20. Preferably, R is methyl and n and n' are 4–18. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the general formula FeSO$_4$.7-H$_2$O. The ratio of ferrous sulfate to aluminum trimethyl is desirably about 1 mole of ferrous sulfate for 6 to 7 moles of aluminum trimethyl. The reaction is evidenced by the evolution of methane.

The mole ratio of aluminum in the alumoxane to total metal in the metallocenes which can be usefully employed can be in the range of about 0.5:1 to about 1000:1, and desirably about 1:1 to about 100:1. Preferably, the mole ratio will be in the range of 50:1 to about 5:1 and most preferably 20:1 to 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Polymerization is generally conducted at temperatures ranging between about 20° and about 300° C., preferably between about 30° and about 200° C. Reaction time is not critical and may vary from several hours or more to several minutes or less, depending upon factors such as reaction temperature, the monomers to be copolymerized, and the like. one of ordinary skill in the art may readily obtain the optimum reaction time for a given set of reaction parameters by routine experimentation.

The catalyst systems described herein are suitable for the polymerization of olefins in solution over a wide range of pressures. Preferably, the polymerization will be completed at a pressure of from about 10 to about 3,000 bar, and generally at a pressure within the range from about 40 bar to about 2,000 bar, and most preferably, the polymerization will be completed at a pressure within the range from about 50 bar to about 1,500 bar.

After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like.

In those situations wherein the molecular weight of the polymer product that would be produced at a given set of operating conditions is higher than desired, any of the techniques known in the prior art for control of molecular weight, such as the use of hydrogen and/or polymerization temperature control, may be used in the process of this invention. If so desired, the polymerization may be carried out in the presence of hydrogen to lower the polymer molecular weight. Care should be taken to assure that terminal ethenylidene unsaturation is not reduced to less than about 30 percent of the polymer chains.

However, the polymers are preferably formed in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added $H_2$ gas, based on the moles of the ethylene monomer charged to the polymerization zone.

When carrying out the polymerization in a batch-type fashion, the reaction diluent (if any), ethylene and alpha-olefin comonomer(s) are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

Preparation of Halogenated Ethylene Alpha-olefin Polymer

The halogenated ethylene alpha-olefin polymer can be prepared by contacting the polymer with halogen (as shown in U.S. Pat. Nos. 3,275,554; 3,438,757; 3,565,804; and 4,000,353, the disclosures of which are hereby incorporated by reference in their entirety). The halogen group on the halogenated polymer is displaced with the nitrogen-containing compound in the subsequent reaction therewith.

For example, an ethylene alpha-olefin, wherein the polymer has an average molecular weight within the range of from 300 to about 20,000, is halogenated with either bromine or chlorine; preferably the latter. The halogen may be conveniently added as gaseous chloride, liquid bromine, or a hydrohalogen, e.g., HCl or HBr gas.

The amount of halogen introduced will depend on the particular hydrocarbon used, the desired amount of amine to be introduced into the molecule, the particular alkylene amine used and the halogen used. The amount of halogen introduced will generally be in the range from about 1 to 5 halogen atoms per molecule, depending on the reactivity of the resulting halide. on a weight percent basis, the amount of halide will generally range from about 1 to 25, more usually from about 1 to 10.

The halogenation step may be conducted in the temperature range of from about ordinary ambient temperatures to about 120° C. To aid in the halogenation step, the polymer may be dissolved in a suitable solvent, such as carbon tetrachloride, in order to lower the viscosity of the polymer, although the use of such a solvent is not necessary.

The time required for halogenation may be varied to some extent by the rate at which the halogen is introduced. Ordinarily from about 2 to about 5 hours is a satisfactory halogenation period.

The reaction product mixture comprising the desired halogenated ethylene-alpha-olefin polymer (e.g., chlorinated ethylene-propylene polymer) will generally contain unreacted polymer, (that is, polymer which is unsubstituted by halogen), in a concentration of less than about 40 wt.% (e.g., from 5 to 35 wt.%), more preferably less than about 30 wt.% (e.g., from 10 to 25 wt.%) and will be generally characterized by a VR value ("viscosity ratio" value) of not greater than about 4.1, usually not greater than about 4.0, preferably from about 2.0 to 3.9, and most preferably from about 3.0 to 3.8. As used herein, the term "VR" value is intended to mean quotient determine by the expression (IV):

$$VR' = \frac{VIS'b}{VIS'a}$$

wherein VISa is the kinematic viscosity (KV) of the halogenated polymer reaction product mixture at 100° C. in units of centistokes (as determined by ASTM Method No. D445) and VISb is the cold cranking simulator (CCS) viscosity of the ene reaction product mixture at −20° C. in units of poise (as determined by ASTM Method No. D2602), wherein the measurements are made upon a 2 wt.% solution of the halogenated polymer reaction product mixture in an oil (herein termed the "reference oil") comprising S15ON (solvent 150 neutral) mineral lubricating oil (Exxon Company U.S.A.), wherein the such reference oil is characterized by an ASTM D445 kinematic viscosity of 5.2 cSt (100°

C.) and an ASTM D2602 ccs viscosity of 19.2 poise (±0.4 poise) (at −20° C.). The "VR$_r$" of value of the reference oil will then be about 3.7±0.1.

It will be understood that the ethylene alpha-olefin polymers of this invention which are charged to the halogenation reaction zone can be charged alone or together with (e.g., in admixture with) other polyalkenes derived from alkenes having from 1 to 20 carbon atoms (butene, pentene, octene, decene, dodecene, tetradodecene and the like) and homopolymers of $C_3$ to $C_{10}$, e.g., $C_2$ to $C_5$, monoolefins, and copolymers of $C_2$ to $c_{10}$, e.g., $C_2$ to $C_5$, monoolefins, said additional polymer having a number average molecular weight of at least about 900, and a molecular weight distribution of less than about 4.0, preferably less than about 3.0 (e.g, from 1.2 to 2.8). Preferred such additional olefin polymers comprise a major molar amount of $C_2$ to $C_{10}$, e.g., $C_2$ to $C_5$ monoolefin. Such olefins include ethylene, propylene, butylene, isobutylene, pentene, octene-1, styrene, etc. Exemplary of the additionally charged homopolymers is polypropylene, polyisobutylene, and poly-n-butene the like as well as interpolymers of two or more of such olefins such as copolymers of: ethylene and propylene (prepared by conventional methods other than as described above f or the preferred ethylene alpha-olef in copolymers employed in this invention, that is, ethylene-propylene copolymers which are substantially saturated, wherein less than about 10 wt% of the polymer chains contain ethylenic unsaturation); butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene: or a copolymer of ethylene, propylene and 1,4-hexadiene; etc. The additional such olefin polymers charged to the reaction will usually have number average molecular weights of at least about 900, more generally within the range of about 1200 and about 5,000, more usually between about 1500 and about 4000. Particularly useful such additional olefin polymers have number average molecular weights within the range of about 1500 and about 3000 with approximately one double bond per chain. An especially useful additional such polymer is polyisobutylene. Preferred are mixtures of such polyisobutylene with ethylene-propylene copolymers wherein at least 30 wt% of the copolymer chains contain terminal ethenylidene monounsaturation as described above.

The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Preparation of Amine-substituted Polymer Products

While not wishing to bound therby, it is believed the halogenation of the ethylene alpha-olefin polymers used in the present invention, because of their high concentration of polymer chains (up to 90% and more) having terminal ethenylidene unsaturation, leads to halogenated polymer chains wherein the halide group is also substantially terminal (that is, wherein the halide group is attached to either the chain and carbon or to a pendant carbon attached to the beta-carbon of the chain). This can be illustrated as follows, employing an ethylene-propylene copolymer (EP) and chlorine for example:

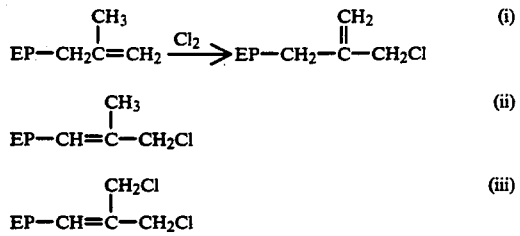

Halogenation is believed to result in a mixture of products of which the Cl mono-terminally substituted polymer is the majority. It is believed form (i) is the major halogenated polymer product, and that form (ii) is produced in the product mixture in lesser concentrations. Form (iii), which is Cl di-substituted illustrates a possible by-product.

Reaction of the halogenated polymer with an amine, e.g., ethylene diamine, will result in a mixture of products formed via EP-nitrogen bonds, and elimination of HCl, and can be illustrated as follows:

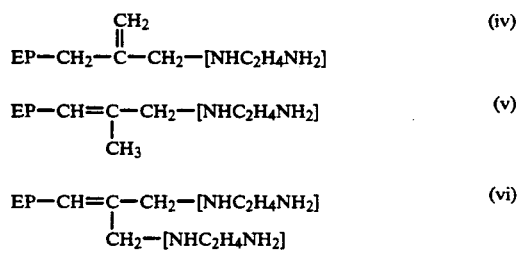

wherein (iv), (v) and (vi) are formed from halogenated products (i), (ii) and (iii), respectively.

However, the above halogenated and aminated EP products are illustrative and are not the only forms which can be envisioned.

The halogenated polymers prepared as described above, can be contacted with one or more amines to form the novel dispersants of this invention.

Amine compounds useful for reaction with the halogenated polymer include mono- and (preferably) polyamines, of about 2 to 60, preferably 2 to 40 (e.g. 3 to 20), total carbon atoms and about 1 to 12, preferably 3 to 12, and most preferably 3 to 9 nitrogen atoms in the molecule. These amines may be hydrocarbyl amines or may be hydrocarbyl amines including other groups, e.g, hydroxy groups, alkoxy groups, amide groups, nitrites, imidazoline groups, and the like. Hydroxy amines with 1 to 6 hydroxy groups, preferably 1 to 3 hydroxy groups are particularly useful. Preferred amines are aliphatic saturated amines, including those of the general formulas:

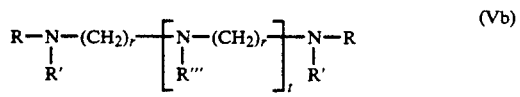

wherein R, R', R" and R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R''' can additionally comprise a moiety of the formula:

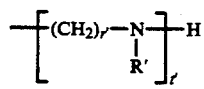  (VI)

wherein R' is as defined above, and wherein r and r' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R'', R''', r, r', t and t' be selected in a manner sufficient to provide the compounds of Formulas Va and Vb with typically at least one primary or secondary amine group, preferably at least two primary or secondary amine groups. This can be achieved by selecting at least one of said R, R', R'' or R''' groups to be hydrogen or by letting t in Formula Vb be at least one when R''' is H or when the VI moiety possesses a secondary amino group. The most preferred amine of the above formulas are represented by Formula Vb and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine: diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (VII):

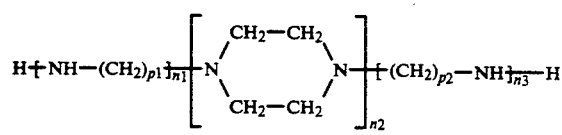

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formula (VIII):

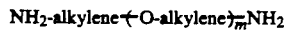

where m has a value of about 3 to 70 and preferably 10 to 35; and the formula (IX):

where n''' has a value of about 1 to 40 with the provision that the sum of all the n''' values is from about 3 to about 70 and preferably from about 6 to about 35, and $R^4$ is a polyvalent saturated hydrocarbon radical of up to ten carbon atoms wherein the number of substituents on the $R^4$ group is represented by the value of all, which is a number of from 3 to 6. The alkylene groups in either formula (VIII) or (IX) may be straight or branched chains containing about 2 to 7, and preferably about 2 to 4 carbon atoms.

The polyoxyalkylene polyamines of formulas (VIII) or (IX) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-40311, etc.

A particularly useful class of amines are the polyamido and related amines disclosed in U.S. Pat. No. 4,857,217 (the disclosure of which is hereby incorporated by reference in its entirety), which comprise reaction products of a polyamine and an alpha, beta unsaturated compound of the formula:

wherein X is sulfur or oxygen, Y is $-OR^8$, $-SR^8$, or $-NR^8(R^9)$ and $R^5$, $R^6$, $R^7$, $R^8$ and $R^9$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with for example the carbonyl group ($-C(O)-$) of the acrylate-type compound of formula X, or with the thiocarbonyl group ($-C(S)-$) of the thioacrylate-type compound of formula X.

When $R^5$, $R^6$, $R^7$, $R^8$ or $R^9$ in Formula X are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of $R^5$ through $R^9$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^5$ through $R^9$ are aryl, the aryl group will generally contain from 6 to 10 carbon atoms (e.g., phenyl, naphthyl).

When one or more of $R^5$ through $R^9$ are alkaryl, the alkaryl group will generally contain from about 7 to 20 carbon atoms, and preferably from 7 to 12 carbon atoms. Illustrative of such alkaryl groups are tolyl, m-ethylphenyl, phenyl, o-ethyltolyl, and m-hexyltolyl. When one or more of $R^5$ through $R^9$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^5$ and $R^9$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^5$ through $R^9$ are heterocyclic, the heterocyclic group generally consists of a compound having at least one ring of 6 to 12 members in which on or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

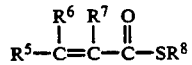  (XI)

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate compounds of formula XI are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

  (XII)

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate thioesters of formula XII are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenvl-2-propenoate, methylmercapto 2-propenoate, methylmercapto 2-methyl-2-propenoate, and the like.

The alpha, beta ethylenically unsaturated carboxyamide compounds employed herein have the following formula:

  (XIII)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated carboxyamides of formula XIII are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

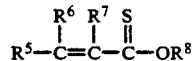  (XIV)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxylate compounds of formula XIV are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

wherein $R^5$, $R^6$, $R^7$, and $R^8$ are the same or different and are hydrogen or substituted or unsubstituted hydrocarbyl as defined above. Examples of alpha, beta-ethylenically unsaturated dithioic acids and acid esters of formula XV are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxyamides of formula XVI are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

where $R^7$ is hydrogen or a $C_1$ to $C_4$ alkyl group, such as methyl, and $R^8$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of formula X wherein X' is oxygen, the resulting reaction product with the polyamine contains at least one amido linkage (—C(O)N<) and such materials are herein termed amido-amines. it Similarly, when the selected alpha, beta unsaturated compound of formula X comprises a compound wherein X' is sulfur, the resulting reaction product with the polyamine contains thioamide linkage (—C(S)N<) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula X tends to yield an amido-amine which is more cross-linked than that obtained where substantially equimolar amounts of reactants are employed. Where f or economic or other reasons a cross-linked amido-amine using excess amine is desired, generally a molar excess of the ethylenically unsaturated reactant of about at least 10%, such as 10-300%, or greater, for example, 25-200%, is employed. For more efficient cross-linking an excess of carboxylated material should preferably be used since a cleaner reaction ensues. For example, a molar excess of about 10-100% or greater such as 10-50%, but preferably an excess of 30-50%, of the carboxylated material. Larger excess can be employed if desired.

In summary, without considering other factors, equimolar amounts of reactants tend to produce a more linear amido-amine whereas excess of the formula XII reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

has more labile hydrogens than ethylene diamine.

These amido-amine adducts so formed are characterized by both amido and amino groups. In their simplest embodiments they may be represented by units of the following idealized formula (XVIII):

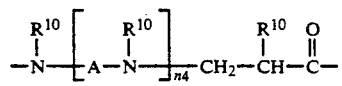

wherein the $R^{10}$'s, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and $n_4$ is an integer such as 1-10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines employed in this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula X are contacted in an amount of from about 1 to 10, more preferably from about 2 to 6, and most preferably from about 3 to 5, equivalents of primary amine in the polyamine reactant per mole of the unsaturated reactant of formula X.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°-90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of formula XII liberates the corresponding $HSR^8$ compound (e.g., $H_2S$ when $R^8$ is hydrogen) as a by-product, and the reaction of an ethylenically unsaturated carboxyamide of formula XIII liberates the corresponding HNR (R compound (e.g., ammonia when $R^8$ and $R^9$ are each hydrogen) as by-product.

The reaction time involved can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene-pentaamine (TEPA) with methyl methacrylate can be illustrated as follows:

$$H_2N[CH_2CH_2NH]_3CH_2CH_2NH_2 + CH_2=CH-\underset{\underset{O}{\|}}{C}-OCH_3 \xrightarrow{-(CH_3OH)}$$

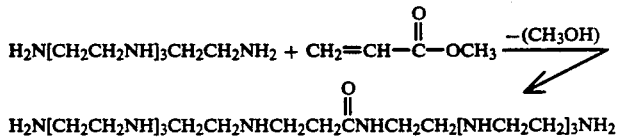

$$H_2N[CH_2CH_2NH]_3CH_2CH_2NHCH_2CH_2\underset{\underset{O}{\|}}{C}NHCH_2CH_2[NHCH_2CH_2]_3NH_2$$

Preparation of the Dispersant

The halogenated ethylene alpha-olefin polymer and amine compound (e.g., alkylene polyamine or polyalkylene polyamine) may be brought together neat or in the presence of an inert solvent, particularly a hydrocarbon solvent. The inert hydrocarbon solvent may be aliphatic or aromatic. Also, aliphatic alcohols may be used by themselves or in combination with another solvent, when capable of dissolving the reactants.

The reaction may be carried out at room temperature (20° C.), but elevated temperatures are preferred. Usually, the temperature will be in the range of from about 100° to 225° C. Depending on the temperature of the reaction, the particular halogen used, the mole ratios and the particular amine, as well as the reactant concentrations, the time may vary from 1 to 24 hours, more usually from about 3 to 20 hours. Times greatly in excess of 24 hours do not particularly enhance the yield and may lead to undesirable degradation. It is therefore preferred to limit the reaction time to fewer than 24 hours.

The mole ratio of halogenated ethylene alpha-olefin polymer to amine compound will generally be in the range from about 0. 2 to 10 moles of amine compound per mole of halogenated ethylene alpha-olefin polymer, more usually 0. 5 to 5 moles of amine compound per mole of halogenated ethylene alpha-olefin polymer. The mole ratio will depend upon the amount of halogen present in the halogenated ethylene alpha-olefin polymer, the particular halogen and the desired ratio of polymer to amine compound.

Small amounts of residual halogen in the final composition are not deleterious. Generally, the residual halogen, as bound halogen, will be in the range of 0 to 10 weight percent of the composition. Small amounts of halogen may be present as the hydrohalide salt of the polymer substituted alkylene polyamines.

Since the ethylene alpha-olefin polymers used will have olefinic unsaturation, the amines may react in a way resulting in the elimination of hydrogen halide, introducing further aliphatic unsaturation into the polymer radical. However, the olefinic unsaturation does not significantly affect the utility of the product, and when available, saturated aliphatic halide may be used.

After the reaction has been carried out for a sufficient length of time, the reaction mixture may be extracted with a hydrocarbon medium to free the product from any low molecular weight amine salt which has formed. The product may then be isolated by evaporation of the solvent. Further separation from unreacted polymer or purification may be carried out as desired, e.g., chromatography.

An example of the reaction of an amido-amine reactant with a halogenated polymer is the reaction of chlorinated ethylene-propylene copolymer (EP-Cl) with a polyamide-amine having two terminal —NH$_2$ groups, which can be illustrated as follows:

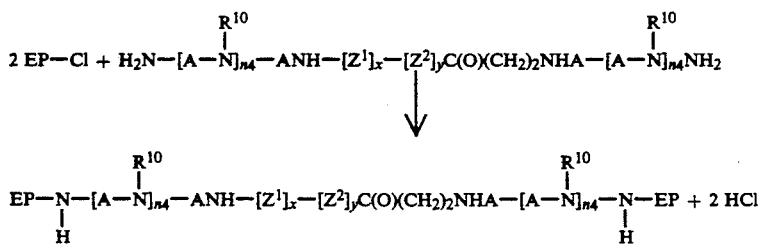

wherein x and y are each integers of from 0 to 10, EP represents an ethylene-propylene copolymer group as described above, $Z^1$ and $Z^2$ are moieties of the formula:

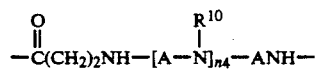

wherein $R^{10}$, A and $n_4$ are as defined above XVIII. Preferred are amido-amine reaction products of the above equation wherein $R^{10}$ is H, and most preferably wherein x and y are each zero, and A is —(CH$_2$)$_2$— or —(CH$_3$H$_7$)—.

It will be understood that the amine reactant can comprise one or a mixture of any of the above described amines, such as a mixture of an amido-amine and a polyalkylene polyamine. Preferably, the halogenated polymer and amine will be contacted for a time and under conditions sufficient to react substantially all of the primary nitrogens in the amine reactant. The progress of this reaction can be followed by infrared analysis.

The dispersant-forming reaction can be conducted in a polar or non-polar solvent (e.g., xylene, toluene, benzene and the like), and is preferably conducted in the presence of a mineral or synthetic lubricating oil.

Hydroxyamines which can be reacted with the aforesaid ethylene alpha-olefin polymer substituted dicarboxylic acid material to form dispersants include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propane-diol, 2-amino-2-ethyl-1,3-propanediol, N-(beta-hydroxypropyl)-N'-(beta-amino-ethyl)-piperazine, tris(hydroxymethyl) amino-methane (also known as trismethylolaminomethane) 2-amino-1-butanol, ethanolamine, beta-(beta-hydroxyethoxy)-ethylamine, and the like. Mixtures of these or similar amines can also be employed. The above description of nucleophilic reactants suitable for reaction with the ethylene alpha-olefin polymer substituted dicarboxylic acid or anhydride includes amines, alcohols, and compounds of mixed amine and hydroxy containing reactive functional groups, i.e., amino-alcohols.

A preferred group of ashless dispersants are those derived from chlorinated ethylene-propylene copolymer and reacted with polyethylene amines (referred to herein as IIEPSAII), e.g., ethylene diamine, diethylene triamine, triethylene tetramine, tetraethylene pentamine, pentaethylene hexamine, polyoxyethylene and polyoxypropylene amines, e.g., polyoxypropylene diamine, trismethylolaminomethane and pentaerythritol, and combinations thereof.

The dispersant materials of this invention are preferably characterized by a VRI value of not greater than about 4.1, preferably not greater than about 4.0, e.g., from about 2.5 to 4.0, and most preferably from about 3.5 to 3.9. As used herein, the term "VR' value" is intended to refer to the quotient obtained by the expression (XIX):

$$VR' = \frac{VIS'b}{VIS'a}$$

wherein VIS'a is the kinematic viscosity (ASTM Method D445) of the dispersant material at 100° C. in units of centistokes, and VIS'b is the cold cranking simulator (CCS) viscosity (ASTM Method D2602) at −20° C. in units of poise, as determined at a dispersant material polymer concentration of 2 wt.% in the reference oil as defined above for Formula IV. Preferably, the disperant materials of this invention are also characterized by a VR'/VR$_r$ ratio of not greater than about 1.11, more preferably not greater than about 1.09, still more preferably from about 0.7 to 1.08 and most preferably from about 0.9 to 1.05, wherein VR$_r$=3.7±0.1 for the reference oil.

Another aspect of this invention involves the post treatment of the nitrogen containing dispersant materials. The process for post-treating said nitrogen containing dispersant materials is analogous to the post-treating processes used with respect to derivatives of conventional ethylene copolymers of the prior art. Accordingly, the same reaction conditions, ratio of reactants and the like can be used.

The nitrogen-containing dispersant materials of the instant invention as described above are post-treated by contacting said nitrogen-containing dispersant materials with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, $C_1$ to $C_{30}$ hydrocarbyl substituted succinic acids and anhydrides (e.g., succinic anhydride, dodecyl succinic anhydride and the like), maleic anhydride (or any of the above discussed monounsaturated carboxylic reactants useful in forming the ethylene-alpha-olefin polymer-substituted mono- and dicarboxylic acid materials employed in this invention), phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols.

For example, the nitrogen containing dispersants can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Usefully the borated dispersants of the invention contain from about 0.05 to 2.0 wt.%, e.g., 0.05 to 0.7 wt.% boron based on the total weight of said borated nitrogen-containing dispersant compound. The boron, which appears to be in the product as dehydrated boric acid polymers (primarily $(HBO_2)_3$), is believed to attach to the dispersant as amine salts, e.g., the metaborate salt of said amine dispersants.

Treating is readily carried out by adding from about 0.05 to 4, e.g. 1 to 3 wt. % (based on the weight of said nitrogen compound) of said boron compound, preferably boric acid which is most usually added as a slurry to said nitrogen compound and heating with stirring at from about 135° C. to 190° e.g., 140°–170° C., for from 1 to 5 hours followed by nitrogen stripping at said temperature ranges. Or, the boron treatment can be carried out by adding boric acid to the hot reaction mixture of the dicarboxylic acid material and amine while removing water.

Since post-treating processes involving the use of these post-treating reagents is known insofar as application to reaction products of amines and halogenated polymers, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,390,086; 3,403,102; 3,428,561; 3,470,098; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,558,743; 3,573,205; 3,692,681; 3,749,695; 3,865,740; 3,954,639; 3,458,530; 3,390,086; 3,367,943; 3,185,704, 3,551,466; 3,415,750; 3,312,619; 3,280,034; 3,718,663, 3,652,616; 4,338,205; 4,428,849; 4,686,054; 4,839,070; 4,839,071; 4,839,072; 4,839,073; U.K. Pat. No. 1,085,903; U.K. Pat. No. 1,162,436.

The nitrogen containing dispersant materials of this invention can also be treated with polymerizable lactones (such as epsilon-caprolactone) t4) form dispersant adducts having moiety $—[C(O) (CH_2)_zO]_MH$, wherein z is a number of from 4 to 8 (e.g., 5 to 7) and m has an average value of from about 0 to 100 (e.g., 0.2 to 20). The dispersants of this invention can be post-treated with a $C_5$ to $C_9$ lactone, e.g., epsilon-caprolactone, by heating a mixture of the dispersant material and lactone in a reaction vessel in the absence of a solvent at a temperature of about 50° C. to about 200° C., more preferably from about 75° C. to about 180° C., and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the $C_5$ to $C_9$ lactone, e.g., epsilon-caprolactone, is reacted with a dispersant material in a 1:1 mole ratio of lactone to dispersant material. In practice, the ration of lactone to dispersant material may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred. For optimum dispersant performance, sequences of from about 1 to about 5 lactone units in a row are preferred.

Catalysts useful in the promotion of the lactone-dispersant material reactions are selected from the group consisting of stannous octanoate, stiannous hexanoate, tetrabutyl titanate, a variety of organic based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary of adducts formed by reaction of dispersant materials if this invention and epsilon caprolactone are those adducts illustrated by the following equation:

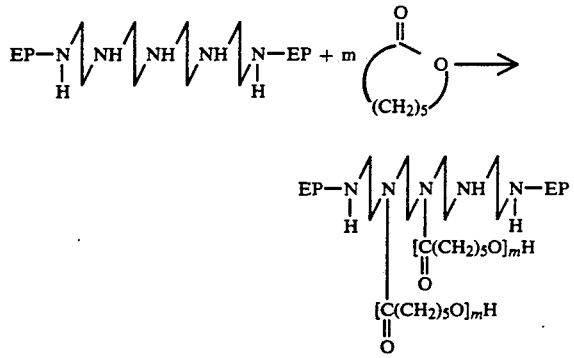

wherein m and EP are as defined above. The reactions of such lactones with dispersant materials containing nitrogen or ester groups is more completely described in U.S. Pat. Nos. 4,486,326; 4,820,432; 4,828,742; 4,851,524; 4,866,135; 4,866,139; 4,866,140; 4,866,141; 4,866,142; and 4,866,187, the disclosure of each of which is hereby incorporated by reference in its entirety.

Further aspects of the present invention reside in the formation of metal complexes of the novel dispersant additives prepared in accordance with this invention. Suitable metal complexes may be formed in accordance with known techniques of employing a reactive metal ion species during or after the formation of the present dispersant materials. Complex forming metal reactants include the metal nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be also found in U.S. Pat. Nos. 3,306,908 and Re. 26,433, the disclosures of which are hereby incorporated by reference in their entirety.

The processes of these incorporated patents, as applied to the compositions of this invention, and the post-treated compositions thus produced constitute a further aspect of this invention.

As a further feature of the present invention, the (A) halogenated ethylene-alpha-olefin polymers of this invention can be admixed, prior to, after, or during being contacted with the selected amine(s), with (B) a conventional halogenated polyolefin derived from any of the polyolefins discussed above as being useful as a mixed charge with the halogenated ethylene-alptia-olefin polymers in the formation of the halogenated ethylene-alpha-olefin polymers of this invention. The halogenated ethylene-alpha-olefin polymers of this invention and the halogenated polyolefins will be generally admixed prior to contact with the selected amine(s), e.g., alkylene polyamine. Such mixtures will generally employ a weight:weight ratio of halogenated ethylene-alpha-olefin polymers of this invention to halogenated polyolefin from about 10:90 to 90:10, preferably from about 20:80 to 80:20, and more preferably from about 40:60 to 60:40. Especially preferred are mixtures of halogenated ethylene-propylene copolymers of this invention and halogenated polyisobutylene, halogenated poly-n-butene, or mixtures thereof, having a number average molecular weight as described above for the above conventional polyolefins, (e.g., 900–5,000). The resulting mixtures can then be contacted for reaction with the selected amine as described above for formation of dispersant materials having improved viscosity properties, wherein the VR' of the resulting dispersant material is preferably less than the VR' of the corresponding dispersant prepared from the polyolefin-substituted mono- or dicarboxylic acid material alone. The resulting mixed dispersant materials can also be treated with any of the above-described post-treatment methods for incorporation of additional functional groups thereon, such as boron, hydroxy, ester, epoxy, lactone, sulfur, metals and the like, as discussed above.

The dispersants of the present invention can be incorporated into a lubricating oil (or a fuel) in any convenient way. Thus, these mixtures can be added directly to the lubricating oil (or fuel) b,( dispersing or dissolving the same in the lubricating oil (or fuel) at the desired level of concentration of the dispersant. Such blending into the additional lubricating oil (or fuel) can occur at room temperature or elevated temperatures. Alternatively, the dispersants can bet blended with a suitable oil-soluble solvent/diluent (such as benzene, xylene, toluene, lubricating base oil and petroleum distillates, including the various normally liquid fuels described in detail below) to form a concentrate, and then blending the concentrate with a lubricating oil (or fuel) to obtain the final formulation. Such dispersant concentrates will typically contain (on an active ingredient (A.I.) basis) from about 3 to about 45 wt. %, and preferably from about 10 to about 35 wt. %, dispersant additive, and typically from about 30 to 90 wt. %, preferably from about 40 to 60 wt. %, base oil, based on the concentrate weight.

OLEAGINOUS COMPOSITIONS

The additive mixtures of the present invention possess very good dispersant properties as measured herein in a wide variety of environments. Accordingly, the additive mixtures are used by incorporation and dissolution into an oleaginous material such as fuels and lubricating oils. When the additive mixtures of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed. The properties of such fuels are well known as illustrated, for example, by ASTM Specifications D #396-73 (Fuel Oils) and D #439-73 (Gasolines) available from the American Society for Testing Materials ("ASTM") , 1916 Race Street, Philadelphia, Penna. 19103.

The fuel compositions of this invention can contain, in addition to the products cf this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, anitoxidants such as 2,6-ditertiary-butyl-4-methylphenol, rust inhibitors, bacteriostatic agents, gum inhibitors, metal deactivators, upper cylinder lubricants arid the like.

The products of the present invention find their primary utility in lubricating oil compositions which employ a base oil in which the additives re dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, and other ashless dispersant (e.g., polyisobutenyl succinimides) and borated derivatives thereof), etc.

In the preparation of lubricating oil formulations it is common practice to introduce the additives in the form of 10 to 80 wt. %, e.g., 20 to 80 wt. % active ingredient concentrates in hydrocarbon oil, e.g. mineral lubricating oil, or other suitable solvent. Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The ashless dispersants of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of polyethylene glycol having a molecular weight of 500-1000, diethyl ether of polypropylene glycol having a molecular weight of 1000-1500); and mono- and polycarboxylic esters thereof, for example, the acetic acid esters, mixed $C_3$-$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tertbutylphenyl)silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Metal containing rust inhibitors and/or detergents are frequently used with ashless dispersants. Such detergents and rust inhibitors include the metal salts of sulphonic acids, alkyl phenols, sulphurized alkyl phenols, alkyl salicylates, naphthenates, and other oil soluble mono- and di-carboxylic acids. Highly basic, that is overbased metal salts which are frequently used as detergents appear particularly prone to interaction with the ashless dispersant. Usually these metal containing rust inhibitors and detergents are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms. For example haloparaffins, olefins obtained by dehydrogenation of paraffins, polyolefins produced from ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a total base number ranging from about 300 to about 400 with the magnesium sulfonate content ranging from about 25 to about 32 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of $C_8$-$C_{26}$ alkyl salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

$$HOOC-ArR_1-X_y(ArR_1OH)n \qquad (XX)$$

where Ar is an aryl radical of 1 to 6 rings, $R_1$ is an alkyl group having from about 8 to 50 carbon atoms, preferably 12 to 30 carbon atoms (optimally about 12), X is a sulfur (—S—) or methylene (—$CH_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula (XXI):

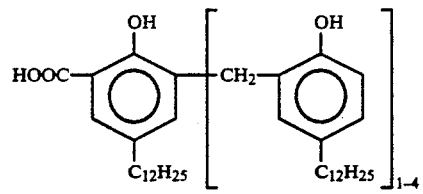

with a TBN of 60 to 150 is highly useful in this invention.

The sulfurized metal phenates can be considered the "metal salt of a phenol sulfide" which thus refers to a metal salt whether neutral or basic, of a compound typified by the general formula (XXII):

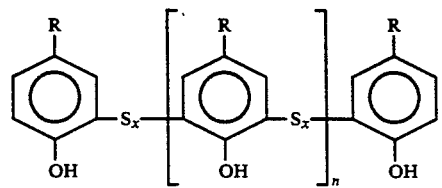

where x = 1 or 2, n 0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with $CO_2$). The overbased sulfurized metal phenates desirably have a TBN value of at least 150, e.g. from 200 to 300.

Magnesium and calcium containing additives although beneficial in other respects can increase the tendency of the lubricating oil to oxidize. This is especially true of the highly basic sulphonates.

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulphonates are preferred.

A particular advantage of the novel dispersants of the present invention is use with V.I improvers to form multi-grade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g., with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Patent Nos. 4,089,794; 4,160,739; 4,137,185; or copolymers of ethylene and propylene reacted or grafted with nitrogen compounds such as shown in U.S. Patent Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-l-pentene, 4-methyl-l-hexene, 5-methylpentene-1, 4,4-dimethyl-l-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$-$C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like.

N-vinyl lactams are also suitable, e.g., N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Dihydrocarbyl dithiophosphate metal salts are frequently used as anti-wear agents and also provide antioxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved anti-wear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

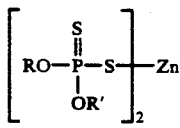
(XXIII)

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl etc. In order to obtain oil solubility, the total number of carbon atoms (i.e., R and R' in formula XXIII) in the dithiophosphoric acid will generally be about 5 or greater.

The antioxidants useful in this invention include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithio-phosphates wherein copper may be substituted for zinc in the compounds and reactions described above although one mole of cuprous or cupric oxide may be reacted with one or two moles of the dithiophosphoric acid, respectively. Alternatively the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful copper compounds are copper ($Cu^I$ and/or $Cu^{II}$) salts of alkenyl succinic acids or anhydrides. The salts themselves may be basic, neutral or acidic. They may be formed by reacting (a) any of the ashless dispersants discussed above, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts of this invention are Cu salts of polyisobutenyl succinic anhydride (hereinafter referred to as CU-PIBSA), and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $\overline{M}_n$ from about 900 to 1400, and up to 2500, with a $\overline{M}_n$ of about 950 being most preferred. Especially preferred is polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., CU-PIBSA, Cu-oleate, or mixtures thereof) will be generally employed in an amount of from about 50-500 ppm by weight of the metal, in the final lubricating composition.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) part per million of added copper based on the weight of the lubricating oil composition. of course, the preferred amount may depend amongst other factors on the quality of the basestock lubricating oil.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of 65° to 315° C. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxy-alkylene hydrocarbyl succinamic acid and mixtures thereof; U.S. Pat. No. 3,879,306 which discloses N-(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are glycerol mono and dioleates, and succinate esters, or metal salts thereof, of hydrocarbyl substituted succinic acids or anhydrides and thiobis alkanols such as described in U.S. Pat. No. 4,344,853.

Pour point depressants lower the temperature at which the lubricating oil will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in the oleaginous compositions of this invention, usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyels and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors in the improved composition of the present invention.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids wherein the alkyl- or alkenyl group contains up to about twenty carbon atoms.

The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased. If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Other suitable demulsifiers include the esters disclosed in U.S. Pat. Nos. 3,098,827 and 2,674,619.

The liquid polyols available from Wyandotte Chemical Co. under the name Pluronic Polyols and other similar polyels are particularly well suited as rust inhibitors. These Pluronic Polyols correspond to the formula:

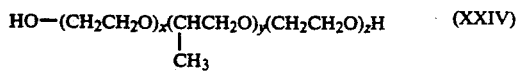

wherein x,y, and z are integers greater than 1 such that the —$CH_2CH_2O$— groups comprise from about 10% to about 40% by weight of the total molecular weight of the glycol, the average molecule weight of said glycol being from about 1000 to about 5000. These products are prepared by first condensing propylene oxide with propylene glycol to produce the hydrophobic base

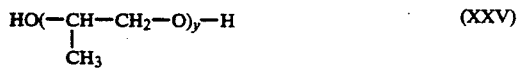

This condensation product is then treated with ethylene oxide to add hydrophylic portions to both ends of the molecule. For best results, the ethylene oxide units should comprise from about 10 to about 40% by weight of the molecule. Those products wherein the molecular weight of the polyol is from about 2500 to 4500 and the ethylene oxide units comprise from about 10% to about 15% by weight of the molecule are particularly suitable. The polyols having a molecular weight of about 4000 with about 10% attributable to ($CH_2CH_2O$) units are particularly good. Also useful are alkoxylated fatty amines, amides, alcohols and the like, including such alkoxylated fatty acid derivatives treated with $C_9$ to $C_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126; and 3,087,932; especially preferred is the compound 2,5 bis (t-octadithio)-1,3,4-thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification 1,560,830. when these compounds are included in the lubricating composition, we prefer that they be present in an amount from 0.01 tO 10, preferably 0.1 to 5.0 weight percent based on the weight of the composition.

Some of these numerous additives can provide a multiplicity of effects, e.g. a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
|---|---|---|
| Viscosity Modifier | 0.01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | 0.1–5 |
| Mineral Oil Base | Balance | Balance |

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A. I. weight of each additive plus the weight of total oil or diluent.

This invention will be further understood by reference to the following examples, wherein all parts are parts by weight, unless otherwise noted and which include preferred embodiments of the invention. In the Examples, wt. % ethylene in the polymers is determined by FTIR (ASTM Method D3900). In the Examples, the "reference oil" is as defined above for Formula IV.

EXAMPLE 1

Preparation of Ethylene-Propylene Copolymer

A stirred 1500 cc steel autoclave reaction vessel which is equipped to perform continuous Ziegler polymerization reactions at pressures up to 2500 bar and temperatures up to 300° C. is used. The reaction system is supplied with a thermocouple and pressure transducer to measure temperature and pressure continuously, and with means to supply continuously purified compressed ethylene and 1-propene. Equipment for continuously introducing a measured flow of catalyst solution at high pressure and equipment for rapidly venting and quenching the reaction and for collecting the polymer product used in the reaction system. In this example, the polymerization is performed with a molar ratio of 1-propene to ethylene in the feed of 6.0 without the addition of a solvent. 1-Propene and ethylene at this molar ratio are continuously pumped into the reactor at a mass flow rate of 40 kg/hour and at a reactor pressure of 1300 bar. The reactor contents are stirred continuously at a rate of 1500 rpm. The temperature of the reactor is maintained at 175° C. by pumping in a catalyst solution using a continuous high pressure injection pump at a rate of 1.7 liters/hour. The catalyst solution is prepared by mixing 2.035 grams of racemic dimethylsilyl bridged 3,3'-bis(methylcyclopentadienyl) zirconium dichloride with 2.0 liters of 10 wt. % (1.4 molar in Al) methylalumoxane (Ethyl Corporation) and 8 liters of toluene. The yield of liquid ethylene-propene copolymer product is 3 kg/hour. The copolymer product has a number average molecular weight of 670 and a composition of 43 mole % propene. The copolymer product is analyzed by FTIR and about 84% of the polymer chains are found to have terminal ethenylidene unsaturation.

EXAMPLE 2

Preparation of Ethylene-Propylene Copolymer

The ethylene-propene copolymer in this Example is prepared using the same equipment and procedure as in Example 1 with the exception that the temperature in the reactor is maintained at 175° C. by continuously pumping in 1.8 liters/hour of a catalyst solution prepared by mixing 198 g. of bis(cyclopentadienyl) zirconium dichloride with 1.0 liter of 10 wt. % (1.4 molar in Al) methylalumoxane (Ethyl Corporation) and 8 liters of toluene. The yield of liquid ethylene-propene copolymer product is 2.9 kg/hour. The copolymer product has a number average molecular weight of 895 and a composition of 44 mole * propene. The copolymer product is analyzed by FTIR and 95% of the polymer chains are found to have terminal ethenylidene unsaturation.

EXAMPLE 3

Preparation of Ethylene-Propylene Copolymer

The ethylene-propene copolymer in this Example is prepared using the same equipment, procedure and catalyst solution as in Example 1 with the exception that the temperature in the reactor is maintained at 200° C. by continuously pumping in 0.54 liters/hour. The yield of liquid ethylene-propene copolymer product is 4.7 kg/hour. The copolymer product has a number average molecular weight of 1040 and a composition of 40 mole % propene. The copolymer product is analyzed by FTIR and 84% of the polymer chains are found to have terminal ethenylidene unsaturation.

EXAMPLES 4-6

Halogenation

In a series of runs, the selected moles of the selected liquid EP copolymers are charged under dry $N_2$ at atmospheric pressure to a 500 ml. reactor equipped with a stirrer and a thermocouple and heated by means of an electric heating mantle. No added solvent or diluent for the reactants is employed. In each run, the reaction mixture is heated to 60° C. and $Cl_2$ is bubbled through the liquid polymer at 60° C. for the selected time while stirring. Dry gaseous nitrogen is passed through the liquid to purge unreacted $Cl_2$ and HCl. The liquid product containing the chlorinated EP and unreacted EP is analyzed for chlorine.

The data thereby obtained are summarized in Table I.

TABLE I

| | Feed | | | |
|---|---|---|---|---|
| Example | EP Copolymer | Copolymer As Prepared In Example | $Cl_2$ Time (Hrs.) | Cl-EP (Wt. % Cl) |
| 4 | $\overline{M}_n = 670$ | 1 | 3 | 5.07 |
| 5 | $\overline{M}_n = 840$ | 2 | 3.4 | 3.89 |
| 6 | $\overline{M}_n = 1040$ | 3 | 4.7 | 3.16 |

NOTES: EP - ethylene-propylene copolymer.

EXAMPLES 7-9

Preparation of Polyamine Dispersants

A series of dispersant materials are prepared employing 250 g. of the CL-EP products prepared as in Examples 4 to 6.

The CL-EP polymers are dissolved in 250 cc toluene and charged under $N_2$ blanket to a 1 liter round-bottom reaction flask provided with stirrer, thermometer and chilled $H_2O$ condenser. To the polymer solution is added ethylene diamine and the mixture is heated to 140° C. under $N_2$ while stirring for 3 to 4 hours. The selected amount of calcium oxide is then added with stirring to neutralize the HCl by-product, and is then filtered. In Examples 8 and 9, an additional 250 ml. of toluene is added with stirring for 0.5 hour to dilute the product for ease of filtration.

The resulting product is filtered and analyzed. The data thereby obtained are summarized in Table II below.

TABLE II

| | | | Dispersant Analysis | | |
|---|---|---|---|---|---|
| Example # | EDA (g) | CaO (g) | Wt. % N | Wt. % Cl | Non-volatile Matter |
| 7 | 210.4 | 39.3 | 1.21 | 1.27 | 50.2 wt. % |
| 8 | 164.1 | 30.6 | 0.58 | 0.67 | 37.2 wt. % |
| 9 | 145.4 | 27.1 | 0.47 | 0.66 | 38.6 wt. % |

Notes: EDA = ethylene diamine.

EXAMPLE 10

Reduction of Intake Valve Deposits

Two 100 hour test runs are made on a standard mileage accumulation dynometer using a 1987 BMW 325 automobile. In Test 1, an unleaded premium gasoline (93 RON) without any additives is tested. In Test 2, a blend of the same gasoline and 800 ppm by weight of the dispersant product of Example 7 is tested. In Test 3, a blend of the same gasoline and 800 ppm by weight of the dispersant product of Example 9 is tested. Following each test, the intake valves are weighed and the weight obtained compared to the weight of the valves before the test. The difference is the total valve deposit weight. The results obtained is shown in Table III below.

TABLE III

| Test No. | Diamine, ppm | Average Deposit Weight, mg/valve |
|---|---|---|
| 1 | — | 235 |
| 2 | 800 | 171 |
| 3 | 800 | 71 |

The data in Table III show that intake valve deposits are significantly reduced when the fuel contains the dispersant materials of this invention.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A fuel composition containing from about 0.001 to 0.5 wt% of an additive which comprises an ethylene alpha-olefin polymer substituted with at least one amine compound, wherein said amine compound is directly attached to the backbone of the polymer, wherein said polymer comprises monomer units derived from ethylene and at least one alpha-olefin of the formula $H_2C=CHT^1$ wherein $T^1$ is an alkyl group of from 1 to 18 carbon atoms, wherein said polymer has a number average molecular weight of from about 300 to 20,000 and an average of at least about 30% of said polymer chains contain terminal ethenylidene unsaturation prior to being substituted with said amine compound, and wherein said additive is characterized by a VR value of less than about 4.1.

2. The fuel composition of claim 1 wherein said polymer has a number average molecular weight of between about 700 and about 20,000.

3. The fuel composition of claim 2 wherein said number average molecular weight is between about 1500 and 10,000.

4. The fuel composition of claim 1 wherein said polymer has a molar ethylene content of between about 20 and about 80 percent.

5. The fuel composition of claim 1 wherein said polymer has a molar ethylene content of between about 45 and about 65 percent.

6. The fuel composition of claim 5 wherein said VR value is less than 4.0.

7. The fuel composition of any of claims 1 to 6 wherein said polymer comprises an ethylene-propylene copolymer.

8. A fuel composition containing from about 0.001 to 0.5 wt. % of an additive which comprises an ethylene alpha-olefin polymer substituted with at least one amine, said polymer comprising monomer units derived from ethylene and at least one alpha-olefin of the formula $H_2C=CHT^1$ wherein $T^1$ is an alkyl group of from 1 to 2 carbon atoms, and wherein said polymer has a number average molecular weight of from about 700 to 20,000 and an average of at least about 60% of said polymer chains contain terminal ethenylidene unsaturation and wherein said additive is characterized by a VR value of less than about 4.1.

9. The fuel composition of claim 8 wherein said polymer contains from about 30 to 70 mole % ethylene.

10. The fuel composition of claim 9 wherein said polymer contains from about 45 to 65 mole % ethylene.

11. The fuel composition of claim 9 wherein said polymer comprises an ethylene-propylene copolymer.

12. The fuel composition of claim 11 wherein said polymer has a number average molecular weight of from about 900 and about 15,000.

13. The fuel composition of claim 12 wherein said polymer has a number average molecular weight of from about 900 and about 15,000.

14. A fuel composition containing from about 0.001 to 0.5 wt. % of an oil soluble dispersant mixture comprising an adduct of:
    (a) an ethylene alpha-olefin polymer substituted with halide moieties, said polymer comprising monomer units derived from ethylene and at least one alpha-olefin of the formula $H_2C—CHT^1$ wherein $R^1$ is an alkyl group of from 1 to 18 carbon atoms, and wherein said polymer has a number average molecular weight of from about 300 to 10,000 and an average of at least about 30% of said polymer chains contain terminal ethenylidene unsaturation and wherein said additive is characterized by a VR value of less than about 4.1, and
    (b) at least one amine, said dispersant having a VR' value of less than about 4.1.

15. The fuel composition according claim 14 wherein said dispersant mixture is characterized by a $VR'/VR_r$ value ratio of less than about 1.11.

16. The fuel composition according to claim 14 wherein the amine contains from 2 to 60 carbon atoms and from 1 to 12 nitrogen atoms per molecule.

17. The fuel composition according to claim 16 wherein said amine comprises a polyalkylenepolyamine wherein said alkylene group contains 2 to 60 carbons and said polyalkylenepolyamine contains from 2 to about 9 nitrogen atoms per molecule.

18. The fuel composition according to claim 17 wherein said amine comprises polyethylenepolyamine.

19. The fuel composition of any one of claims 14 to 18 wherein said alpha-olefin is propylene.

20. The fuel composition of claim 14 containing from about 0.005 to about 0.15 wt. % of said dispersant mixture.

* * * * *